United States Patent
Kuroda et al.

(10) Patent No.: US 9,666,382 B2
(45) Date of Patent: May 30, 2017

(54) SILVER AND COPPER ALLOYED RIVET CONTACT

(71) Applicant: Tanaka Kikinzoku Kogyo K.K., Tokyo (JP)

(72) Inventors: Masao Kuroda, Tomioka (JP); Hiroshi Shirahata, Tomioka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 6 days.

(21) Appl. No.: 14/784,739

(22) PCT Filed: Dec. 13, 2013

(86) PCT No.: PCT/JP2013/083420
§ 371 (c)(1),
(2) Date: Oct. 15, 2015

(87) PCT Pub. No.: WO2014/178155
PCT Pub. Date: Nov. 6, 2014

(65) Prior Publication Data
US 2016/0064157 A1    Mar. 3, 2016

(30) Foreign Application Priority Data

May 2, 2013   (JP) .................................. 2013-096708

(51) Int. Cl.
*H01H 1/02* (2006.01)
*H01H 1/023* (2006.01)
(Continued)

(52) U.S. Cl.
CPC .............. *H01H 1/02* (2013.01); *B32B 15/01* (2013.01); *B32B 15/04* (2013.01); *C22C 5/06* (2013.01);
(Continued)

(58) Field of Classification Search
CPC .......... H05K 2201/0367; H01H 1/021; H01H 1/025; H01H 1/023; H01H 11/041; H01H 11/045
(Continued)

(56) References Cited

U.S. PATENT DOCUMENTS

2014/0201999 A1* 7/2014 Kita ......................... B21J 15/02
29/874

FOREIGN PATENT DOCUMENTS

JP  3-43916 A   2/1991
JP  5-282957 A  10/1993
(Continued)

OTHER PUBLICATIONS

International Search Report PCT/JP2013/083420.

*Primary Examiner* — Vanessa Girardi
(74) *Attorney, Agent, or Firm* — Orrick Herrington & Sutcliffe, LLP (57) ABSTRACT

The present invention is a rivet contact including a head portion and a foot portion having a smaller width than the head portion, wherein the head portion contains a contact material layer having at least a top containing an Ag-based contact material; the rest of the head portion and the foot portion contain a base material containing Cu or a Cu alloy; and a barrier layer including an Ag alloy is provided at a junction interface between the contact material and the base material. Here, an Ag alloy obtained in such a manner that one or more base metal elements of Sn, In, Cu, Ni, Fe, Co, W, Mo, Zn, Cd, Te, and Bi are added to Ag by 0.03 to 20 mass % is preferably used as the Ag alloy constituting the barrier layer.

20 Claims, 7 Drawing Sheets (51) Int. Cl.
  *B32B 15/01* (2006.01)
  *B32B 15/04* (2006.01)
  *C22C 5/08* (2006.01)
  *H01H 11/04* (2006.01)
  *C22C 5/06* (2006.01)
  *C22C 5/10* (2006.01)
  *H01H 1/025* (2006.01)

(52) U.S. Cl.
  CPC .................. *C22C 5/08* (2013.01); *C22C 5/10* (2013.01); *H01H 1/023* (2013.01); *H01H 11/04* (2013.01); *H01H 11/045* (2013.01); *H01H 1/025* (2013.01)

(58) Field of Classification Search
  USPC .................. 200/262, 265–270; 228/115, 3.1; 439/931; 29/882, 844
  See application file for complete search history.

(56) References Cited

FOREIGN PATENT DOCUMENTS

| | | |
|---|---|---|
| JP | 3098834 U | 10/2003 |
| JP | 2008-270192 A | 11/2008 |

\* cited by examiner

MANUFACTURE JUNCTION MATERIAL BY JOINING FIRST TO THIRD BILLETS TO EACH OTHER

Fig. 4(B)

PERFORM FORMING PROCESS ON JUNCTION MATERIAL INTO RIVET TYPE

Fig. 4(C)

PERFORM FORMING PROCESS ON HEAD PORTION USING METAL DIE

--Prior Art--

Fig. 7(b)

--Prior Art--

SILVER AND COPPER ALLOYED RIVET CONTACT

TECHNICAL FIELD

The present invention relates to a rivet contact, in particular a rivet contact capable of reducing the amount of a contact material such as an Ag alloy to be used and also has a good endurance life even under the use environment where the contact is subjected to a high capacity load.

BACKGROUND ART

Electric contacts that mechanically switch electric circuits have been used as components of various switches or relays of electric equipment in a wide range of fields from home appliances, OA equipment, electric parts for automobiles, and the like to heavy electric machinery. As the switching-type electric contacts, there is a tip-shaped contact that is directly joined to a support member such as a spring member, but a rivet contact is generally used in many cases. The rivet contact includes a head portion acting as an electric contact and a foot portion having a smaller width than the head portion. The foot portion is deformed by a caulking when the rivet contact is fixed to the support member.

Then, the electric contact is required to be capable of maintaining reliable mechanical switching, that is, capable of transmitting current and signal flowing to the contact without hindrance at the time of contacting and be separated without hindrance at the time of disconnection. Further, the electric contact is also required to have a stable contact resistance. On the other hand, melting, evaporation, consumption, and the like of the material due to discharge occur on a surface of the switching contact. These phenomena inhibit a contacting function of the electric contact and sometimes fuse the contacts together. These become factors of causing performance deterioration or a breakdown of an electric product or the like. For this reason, many studies also have been made on constituent materials in order that the electric contact becomes capable of performing the basic functions described above even under such severe loads. Among them, a suitable contact material is currently considered an Ag-based contact material, and in particular, an oxide-dispersed Ag alloy (Ag—$SnO_2$ alloy, Ag—$SnO_2$—$In_2O_3$ alloy, Ag—ZnO alloy, or the like) having various metal oxides such as $SnO_2$, $In_2O_3$, and CuO dispersed in an Ag matrix is often applied.

The entire structure of the conventional rivet contact is often formed of a contact material. However, recently, in consideration of the expensive contact material such as the Ag alloy, it has been general to use a double-layered rivet contact in which the contact material is applied to a portion of the contact in order to reduce a cost of a member and a relatively low-cost material (base material) such as Cu and a Cu alloy constitutes other portions of the contact.

Figure 7A:
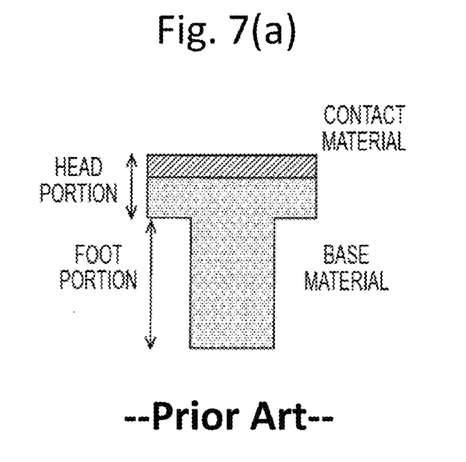
FIG. 7(a) is a view illustrating a configuration of a conventional rivet contact having a double-layered structure according to the prior art.
Figure 7B:
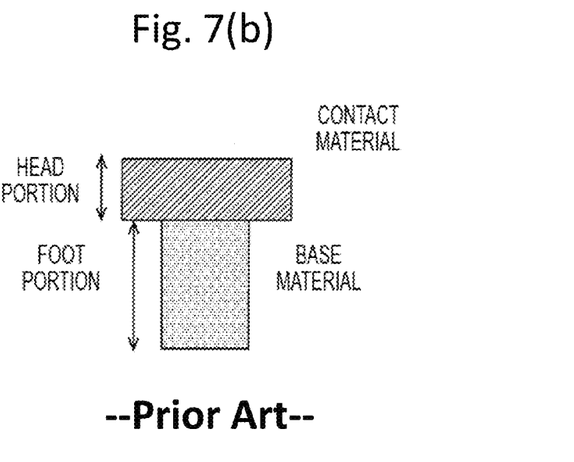
FIG. 7(b) is a view illustrating a configuration of an alternative conventional rivet contact having a double-layered structure according to the prior art.

As such a double-layered rivet contact having a combination of the Ag alloy and the Cu-based material, there are known, for example, a rivet contact in which a contact material constitutes a top portion of a head portion and a base material such as Cu constitutes a bottom of the head portion and a foot portion (FIG. 7(a), see Patent Document 1), and a rivet contact in which a contact material constitutes the entire head portion and a base material constitutes a foot portion (FIG. 7(b), see Patent Document 2).

RELATED ART DOCUMENT

Patent Documents

Patent Document 1: JP 5-282957 A
Patent Document 2: Japanese Utility Model Registration No. 3098834

SUMMARY OF THE INVENTION

Problems to be Solved by the Invention

The conventional double-layered rivet contact is satisfactory in terms of both the cost of the member and the contacting function. Endurance of the conventional double-layered rivet contact is sufficient for general use.

However, as described above, the use of the switching contact wildly ranges from switching and interrupt of a low load to switching and interrupt of a high load such as several tens to hundreds amperes of a rated current. According to the present inventors, in such high-load use, the conventional double-layered rivet contact has a problem in the contact material portion containing the Ag alloy that is peeled from the base material in the course of use. When the peeling of the contact material occurs in one contact (fixed contact), the other contact (movable contact) comes in contact with or short-circuits from the base material. This may become a factor of a failure of the equipment.

The above-described problem in the rivet contact having the double-layered structure occurs due to the fact that the combination of different materials constitutes the contact. The problem does not occur as long as an Ag alloy constitutes the entire contact, but the double-layered rivet contact is a reasonable configuration in consideration of costs of members. Therefore, there is a demand of considering the endurance of the contact while maintaining such a reasonable configuration. Thus, the present invention provides a rivet contact having an excellent endurance life without peeling and falling of the contact material as described above.

Means for Solving the Problems

In order to solve the above problems, first, the present inventors have investigated the factor of the peeling of the contact material which occurs in the conventional double-layered rivet contact. As a result, the present inventors have paid attention to the behavior of oxygen in an environment specific to a high-capacity switching contact.

During the contacting between contacts, the surface of each contact is subjected to a load of arc heat or Joule heat depending on an electric capacity of the contact, and a temperature of a surface of a high-capacity contact considerably increases. At this time, oxygen in an external atmosphere (air) enters the contact material. Here, since Ag serving as a main constituent metal of the contact material is a metal into which the oxygen can easily diffuse, the oxygen having entered diffuses into the contact material and eventually arrives at a junction interface between the contact material and the base material. Then, the oxygen arrived at the junction interface forms a Cu oxide by bonding and oxidizing to/with Cu constituting the base material. Since the Cu oxide has weak bonding force with respect to the contact material (Ag), the Cu oxide causes the peeling.

In addition, as an influence of the oxygen, an influence of oxygen contained in the contact material itself can also be considered in addition to the oxygen that enters from the external atmosphere. This means that, when an Ag-oxide alloy is applied as the contact material, the oxygen of the oxide to be dispersed dissociates from the oxide under a high temperature, and diffuses into the contact material to arrive at the junction interface and form an oxide at the junction interface.

From the above investigation, the present inventors have considered that suppressing the formation of oxides at the junction interface between the contact material and the base material is effective to suppress the peeling of the contact material. As a matter of course, it is not clear whether the factor of the formation of the oxides is the oxygen from the external atmosphere or the oxygen from the oxide in the contact material. Further, it is not possible to change the external atmosphere of the contact. In addition, the oxide in the contact material is a main constituent in the Ag-oxide alloy, and it is not realistic to limit the amount of the oxide in the case of applying the Ag-oxide alloy.

Thus, the present inventors have found that a barrier layer that inhibits the diffusion of the oxygen into the junction interface is set as means of suppressing the formation of the oxides at the junction interface and further the Ag alloy is preferably applied as a constituent material of the barrier layer, and have devised the present invention.

That is, the present invention is a rivet contact including a head portion and a foot portion having a smaller width than the head portion, wherein the head portion has a contact material layer having at least a top containing an Ag-based contact material, the rest of the head portion and the foot portion contain a base material containing Cu or a Cu alloy, and a barrier layer containing an Ag alloy is provided at a junction interface between the contact material layer and the base material.

The present invention will be described below in detail. According to the present invention, the rivet contact having the double-layered structure in which the head portion contains the contact layer having at least the top containing the Ag-based contact material and the base material containing Cu or the Cu alloy constitutes the rest of the head portion and the foot portion is made into a three-layered structure in which the barrier layer containing the Ag alloy is formed at the junction interface between the contact layer and the base material.

Thus, the barrier layer which is a feature of the present invention will be described. Since additive elements of the Ag alloy (constituent elements other than Ag) preferentially bond to oxygen and form oxides, the barrier layer containing the Ag alloy according to the present invention inhibits the arrival of oxygen at the junction interface and prevents the generation of a Cu oxide. The Ag alloy constituting the barrier layer has sufficient junction force with respect to both of the contact material (Ag-based contact material) and the base material (Cu). In addition, since the Ag alloy has good conductivity and toughness, it is possible to prevent the generation of oxides at the junction interface without impairing electrical properties as a contact.

In this regard, it can also be considered that a material into which oxygen is difficult to diffuse, rather than the Ag alloy is applied as a constituent material of the barrier layer to invalidate the movement itself of the oxygen to the junction interface. However, kinds of metal materials into which the oxygen does not diffuse are limited. In addition, there are few materials having excellent conductivity and toughness and also having sufficient junction force with respect to both of the contact material and the base material. In contrast, the barrier layer containing the Ag alloy consuming the oxygen as in the present invention precipitates oxides in the course of use and thus is turned into an Ag-oxide alloy similar to the contact material. This means that wear resistance and fusing resistance of the barrier layer are improved in the course of use, and also provides an advantage that the barrier layer can act as a backup when the contact material is worn.

The Ag alloy serving as the barrier layer is preferably an Ag alloy obtained in such a manner that one or more base metal elements of Sn, In, Cu, Ni, Fe, Co, W, Mo, Zn, Cd, Te, and Bi are added to Ag by 0.03 to 20 mass %. When the amount of these base metals to be added is less than 0.03%, oxygen will arrive at the junction interface. In addition, when the amount of the base metals to be added exceeds 20 mass %, the junction strength with the base material becomes unstable. Note that in a case where a plurality of additive elements is present, the amount of the additive elements to be added is a total amount of these additive elements. In addition, the Ag alloy constituting the barrier layer may contain inevitable impurities.

Here, the "Ag alloy" constituting the barrier layer means to contain both of a solid-solution alloy in which Ag and additive elements (base metal) are dissolved in a solid and a composite alloy in which additive elements not dissolved in a solid partially precipitate. In any of the forms, the additive elements oxidize and thus a function as a barrier layer is exerted.

A specific example of the Ag alloy constituting the barrier layer contains an Ag alloy (Ag—Cu alloy) obtained in such a manner that 0.5 to 20 mass % Cu is added to Ag. The amount of Cu to be added is preferably 3.0 to 20 mass %. Further, an Ag alloy obtained in such a manner that 0.03 to 1.0 mass % Ni is added to the Ag—Cu alloy is also applicable.

In addition, as the Ag alloy constituting the barrier layer and having an element other than Cu added thereto, an Ag alloy obtained in such a manner that at least any of Sn, In, Zn, and Cd is added to Ag by 0.5 to 20 mass % is also applicable. For example, an Ag alloy (Ag—Sn—In alloy) obtained in such a manner that 1.0 to 10 mass % Sn and 0.5 to 10 mass % In are added to Ag is preferable. Then, an Ag alloy obtained in such a manner that at least any of Ni and Te is added to the Ag—Sn—In alloy by 0.01 to 1.0 mass % in total, and an Ag alloy obtained in such a manner that at least any of Fe, Co, Zn, Cu, Bi, and Cd is added to the Ag—Sn—In alloy by 0.01 to 1.0 mass % in total are also applicable.

Further, in addition to the above-described Ag alloys, it is considered that an Ag alloy obtained in such a manner that at least any of Ni, Fe, Co, W, and Mo is added to Ag by 0.03 to 20 mass % in total is also useful. Since these additive elements each have a relatively low solid-solution limit with respect to Ag, the resulting Ag alloy is a composite Ag alloy in which the additive elements partially and independently precipitate. At this time, when Ni is an additive element, the lower limit of the amount of Ni to be added is preferably 0.03 mass %. In addition, when Fe, Co, W, and Mo are additive elements, the lower limit of the total amount of Fe, Co, W, and Mo to be added is preferably 0.05 mass %.

The thickness of the barrier layer is preferably 0.03 mm to 0.3 mm. When the thickness is less than 0.03 mm, an oxygen capturing action of the barrier layer is insufficient and it is not possible to sufficiently suppress the formation of oxides at the junction interface. The upper limit of the thickness of the barrier layer is not particularly limited, but is preferably about 0.3 mm in consideration of the dimension of the contact.

The rivet contact of the present invention provided with the barrier layer described above is basically the same in other configurations as the conventional rivet contact having the double-layered structure.

The contact material layer forming the top of the head portion contains the Ag-based contact material and is, specifically, pure Ag or an Ag alloy (Ag—Ni alloy, Ag—Cu alloy or the like). As the Ag alloy, an oxide-dispersed Ag-oxide alloy (Ag—$SnO_2$ alloy, Ag—$SnO_2$—$In_2O_3$ alloy, Ag—ZnO alloy, or the like) is also applicable. Note that the present invention is particularly useful in a case where the Ag-oxide alloy is applied as the contact material. The reason is that oxygen may diffuse from the oxides in the contact material as described above. In addition, as the base material which is joined to the contact material and mainly forms the foot portion, Cu or a Cu alloy (Cu—Ni alloy or Cu—Sn alloy) is applicable.

Note that the contact material only needs to be joined to the top of the head portion. The preferred thickness of the contact material can be adjusted depending on a contact load (rated current or the like). The thickness only needs to be 0.1 mm or more as for a low load contact, but is necessary to be about 1 to 2 mm as for a high load (rated current of 50 A or more) contact such as a breaker. In a specific aspect of the present invention, only a top portion of the head portion may be formed of the contact material (FIG. 1(a)) and also the entire head portion may be formed of the contact material and the foot portion may be formed of the base material (FIG. 1(b)).

Figure 2:
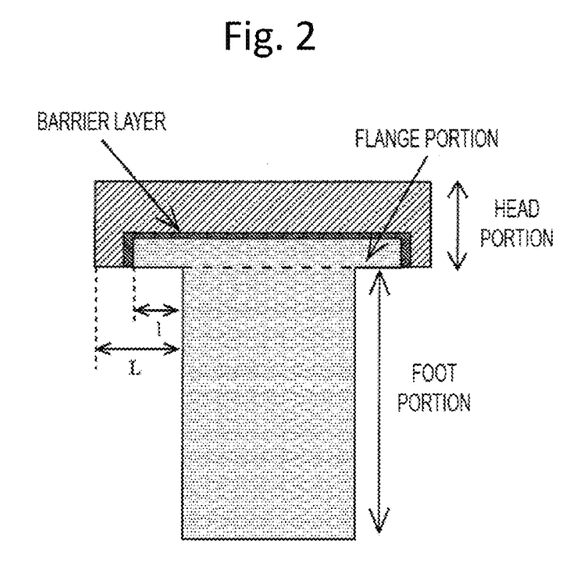
FIG. 2 is a view illustrating an example of another configuration of a rivet contact according to one embodiment of the present disclosure.

In addition, as illustrated in FIG. 2, the foot portion is formed of the base material and a flange portion having a diameter larger than the foot portion is formed in the shape of the foot portion, whereas the head portion is formed of the contact material and the foot portion comes in contact with the head portion in an embedded manner such that a lower end face of the flange portion becomes substantially flat with respect to a lower end face of the head portion. At this time, a length (l) between an endmost portion of the flange portion and a starting point of the foot portion is preferably l<L (preferably, 0.4 L≤l≤0.6 L) with respect to a length (L) between an endmost of the head portion and the starting point of the foot portion.

Figure 1A:
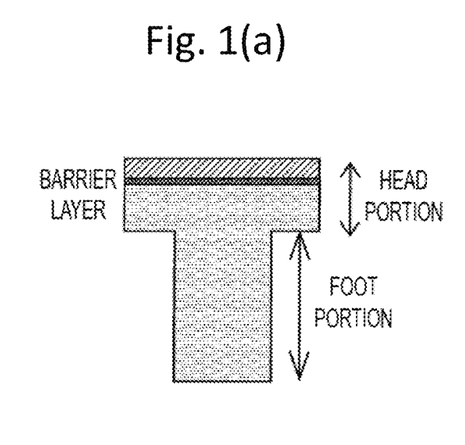
FIG. 1(a) is a view illustrating an example of a configuration of a rivet contact according to one embodiment of the present disclosure.
Figure 1B:
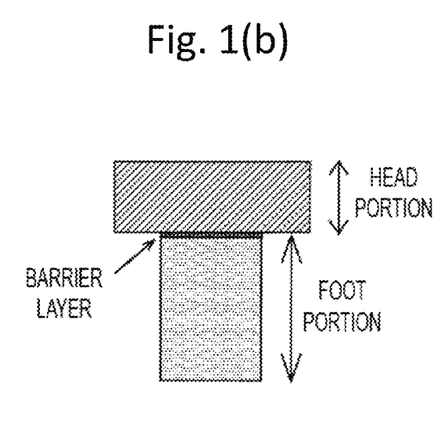
FIG. 1(b) is a view illustrating an alternative example of a configuration of a rivet contact according to one embodiment of the present disclosure.
Figure 3A:
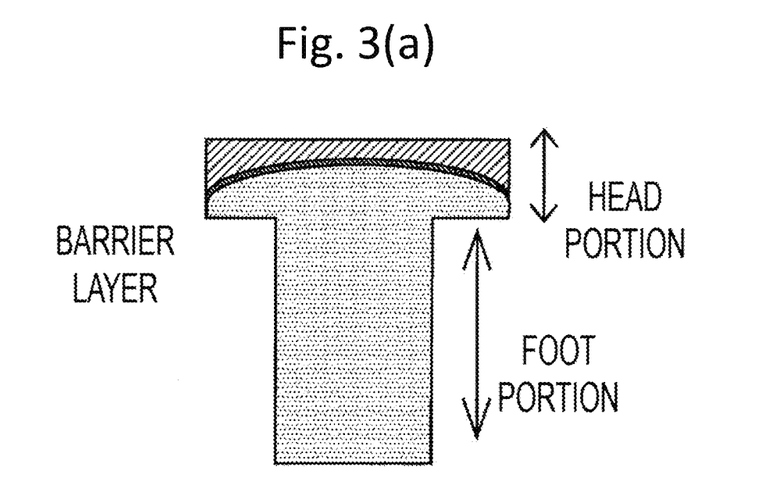
FIG. 3(a) is a view illustrating a state of a junction interface in the rivet contact according to one embodiment of the present disclosure.
Figure 3B:
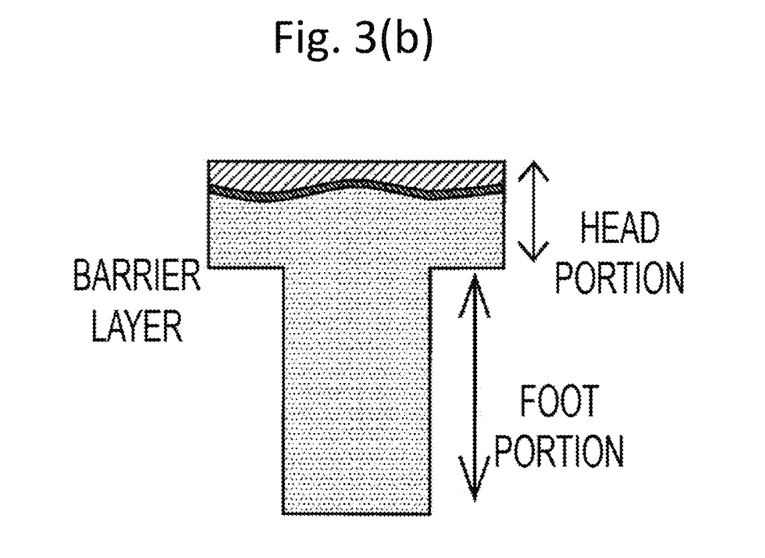
FIG. 3(b) is a view illustrating an alternative state of a junction interface in the rivet contact according to one embodiment of the present disclosure.

Further, the thickness of the barrier layer is preferably uniform, but the shape of the barrier layer needs not to be perfectly plane. That is, the barrier layer may be formed along the substantially flat junction interface as illustrated in FIG. 1(a), but the barrier layer may be formed along an arc-shaped junction interface as illustrated in FIGS. 3(a) and 3(b). Further, the junction interface may be in a wavy state.

In order to manufacture the rivet contact according to the present invention, it is necessary to perform a forming process on the rivet contact having the head portion and the foot portion in a state where the contact material, the Ag alloy serving as the barrier layer, and the base material are firmly joined to each other in order to ensure the endurance. Here, a method of manufacturing the rivet contact according to the present invention includes: butt press-joining a first billet containing a contact material, a second billet containing an Ag alloy, and a third billet containing a base material to each other to manufacture a composite material; forming a rivet-shaped space by a combination of a junction punch having a recessed space and a junction die having a cylindrical space; press-fitting the composite material into the space of the junction punch from a lower part of the junction die; and filling the space with the first billet inside the junction punch to form a contact material layer constituting at least a top layer of a head portion, and filling the second billet and the third billet in a residual space inside the junction punch at the same time to form the rest of the head portion, a barrier layer, and a foot portion.

In the method of manufacturing the rivet contact according to the present invention, first, the first billet containing the contact material, the second billet containing the Ag alloy, and the third billet containing the base material are press-joined to each other to make a composite material. A process of manufacturing the composite material is essential to manufacture the rivet contact according to the present invention. The first billet and the second billet are firmly joined to each other, and thus a junction surface follows deformation of the first billet during forming of the head portion and the second billet and the third billet can also be deformed. The press-joining is preferably performed by a powerful process load of 0.8 to 3.0 ton·f.

It is possible to form the rivet contact by press-fitting the manufactured composite material into a die formed by a combination of the junction punch and the junction die. In the forming process, the first billet press-fitted into the space of the junction punch becomes in a shape of the head portion while being deformed by a wall surface of the junction punch, and each junction surface of the composite material follows this deformation such that the rest of the head portion, the barrier layer, and the foot portion are formed. At this time, the form of the rivet contact can be adjusted by a relation between a volume of the first billet and an inner space volume of the junction punch. When the volume of the first billet is smaller than the inner space volume of the junction punch, the head portion containing three layers of the contact material layer, the barrier layer, and the base material as illustrated in FIG. 1(a) is formed. In addition, when the volume of the first billet is equal to or more than the inner space volume of the junction punch, since there is no residual space inside the junction punch, the entire head portion is formed of the contact material (FIG. 1(b)). A load in the press-fitting the composite material only needs to be a load capable of deforming and processing the first billet, and can be adjusted depending on kinds of contact materials of the first billet.

The manufacturing of the composite material and the forming process by means of the press-fitting as described above can be performed at room temperature. With respect to the rivet contact formed with the head portion and the flange portion, the head portion may be suitably subjected to a forming process with press workability. The forming process is useful when strict regulation is necessary for the shape and dimension of the head portion.

Advantageous Effects of the Invention

As described above, the rivet contact according to the present invention is an improved double-layered rivet contact obtained by a combination of the Ag-based contact material and the base material such as Cu, peeling and falling of the contact material are suppressed by the setting of the barrier layer, and endurance life of the rivet contact is excellent.

DESCRIPTION OF EMBODIMENTS

Hereinafter, preferred Examples of the present invention will be described.

First Embodiment

Examples 1 to 5

Figure 4A:
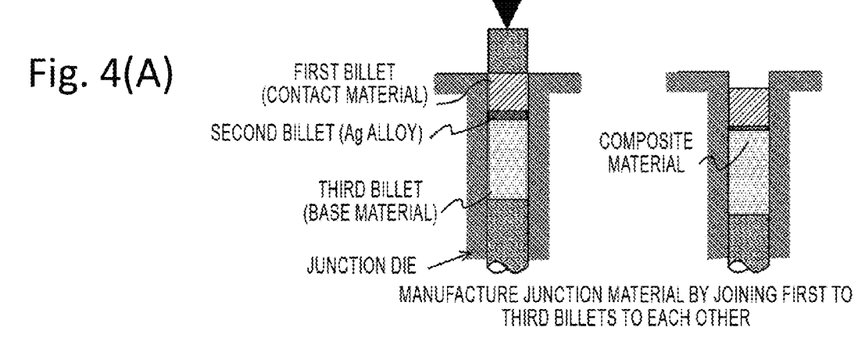
FIG. 4(A) is a view illustrating a process of manufacturing the rivet contact according to one embodiment of the present disclosure.
Figure 4B:
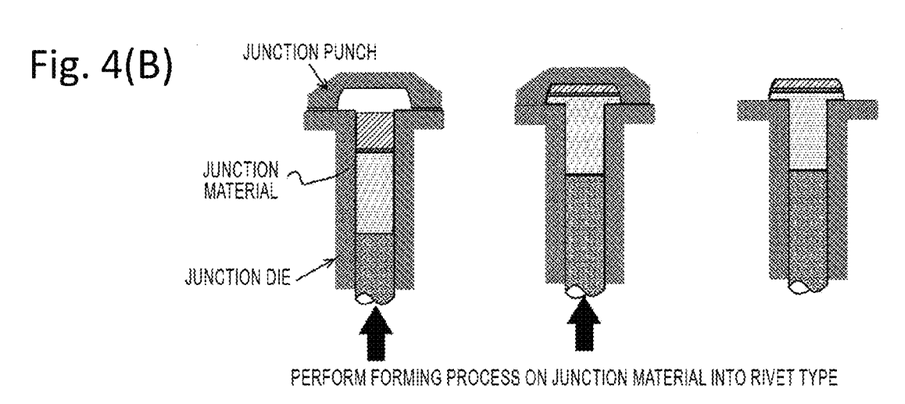
FIG. 4(B) is another view illustrating a process of manufacturing the rivet contact according to one embodiment of the present disclosure.
Figure 4C:
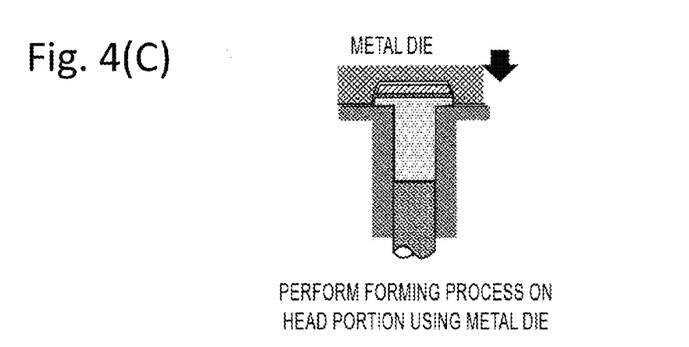
FIG. 4(C) is another view illustrating a process of manufacturing the rivet contact according to one embodiment of the present disclosure.

An Ag-oxide alloy was used as a contact material, Cu was applied as a base material, and an Ag—Cu alloy having 3.0 to 20 mass % Cu and 0.5 mass % Ni added thereto was applied as a barrier layer to manufacture a rivet contact. FIGS. 4(A) to 4(C) illustrate processes of manufacturing the rivet contact according to this embodiment. First, a first billet (dimension: φ 2.2 mm, 0.79 mm) was cut out from a wire of an Ag-oxide alloy (Ag—SnO$_2$—In$_2$O$_3$ alloy: Trade Name SIE-29 B), a second billet (dimension: φ 2.2 mm, 0.14 mm) was cut out from a wire of an Ag—Cu alloy, and a third billet (dimension: φ 2.2 mm, 2.1 mm) was cut out from a wire of Cu.

Then, as illustrated in FIG. 4(A), the first billet, the second billet, and the third billet were overlapped with each other to be inserted into a junction die, and were press-joined to each other to make a composite material. The junction die has a cemented carbide hole having a diameter of φ 2.45 mm. Then, a load for this joining was 2.2 ton·f. Note that the first to third billets were inserted into the junction die and were joined to each other in this embodiment because of convenience of being capable of directly performing a forming process and also in order to impart proper restraint in a transverse direction such that the composite material is not excessively deformed. Note that the diameter of the die hole into which each of the billets is inserted is preferably applied to be larger than a diameter of the billet by 0.05 to 0.25 mm.

Next, as illustrated in FIG. 4(B), a junction punch was set on the junction die and the composite material was processed into a rivet shape. The junction punch is formed of cemented carbide and has a disc shape space having curved sides (dimension: a top having φ 2.4 mm, a bottom having φ 2.8 mm, and a height of 1.1 mm). In this process, the composite material was press-fitted all at once into the space of the junction punch from a lower part of the junction die such that the first billet portion forms a top of a head portion, the third billet forms a lower portion of the head portion and a foot portion, and the second billet was deformed to form a barrier layer.

After the rivet contact was made by a metal die, as illustrated in FIG. 4(C), the junction punch was moved and the top of the head portion was subjected to press forming by a mortar-shaped metal die for forming. The rivet contact manufactured as described above has the following dimension: the head portion having φ 3.2 mm and a thickness of 0.8 mm and the foot portion having φ 2.45 mm and a length of 1.2 mm. Then, the thickness of the contact layer of the head portion was 0.45 mm, and the thickness of the barrier layer was 0.07 μm.

Comparative Examples 1 to 3

Here, an Ag-oxide alloy (Ag—SnO$_2$—In$_2$O$_3$ alloy) was applied as a contact material, Cu was applied as a base material, and an Ag—Cu alloy having pure Ag (Comparative Example 1) and 0.3 mass % Cu (Comparative Example 2) and 28 mass % Cu (Comparative Example 3) added thereto was applied as a barrier layer to manufacture a rivet contact.

Conventional Example

Further, an Ag-oxide alloy (Ag—SnO$_2$—In$_2$O$_3$ alloy) was applied as a contact material, Cu was applied as a base material, and a conventional rivet contact not having a barrier layer was manufactured. A first billet and a third billet were joined to each other with no use of a second billet (Ag—Cu alloy) in the manufacturing process of Example 1 and were subjected to a forming process in the same manner as in Example 1. The thickness of the contact layer was the same as in Example 1.

A heating test was performed on each of the rivet contacts of Examples, Comparative Examples, and Conventional Example to confirm the presence or absence of peeling of the contact material under a high-temperature atmosphere. In the heating test, each of the contacts was heated to 600° C., 700° C., and 750° C. for three hours, and subsequently the head portion of the rivet contact was compressed in a transverse direction to observe the presence or absence of the peeling of the junction interface when the head portion was compressed until the diameter of the head portion became ½. The result of the heating test is indicated in Table 1.

TABLE 1

| | Configuration of contact (Contact material/ barrier layer/base material) | Heating test | | |
| --- | --- | --- | --- | --- |
| | | 600° C. | 700° C. | 750° C. |
| Example 1 | SIE-29B/Ag—3.0Cu/Cu | ○ | ○ | ○ |
| Example 2 | SIE-29B/Ag—10Cu/Cu | ○ | ○ | ○ |
| Example 3 | SIE-29B/Ag—15Cu/Cu | ○ | ○ | ○ |

TABLE 1-continued

| Configuration of contact (Contact material/barrier layer/base material) | Heating test 600° C. | 700° C. | 750° C. |
|---|---|---|---|
| Example 4 | SIE-29B/Ag—20Cu/Cu | ○ | ○ | ○ |
| Example 5 | SIE-29B/Ag—4.0Cu—Ni0.5/Cu | ○ | ○ | ○ |
| Comparative Example 1 | SIE-29B/Ag/Cu | ○ | X | X |
| Comparative Example 2 | SIE-29B/Ag—0.3Cu/Cu | ○ | X | X |
| Comparative Example 3 | SIE-29B/Ag—28Cu/Cu | X | X | X |
| Conventional Example | SIE-29B/Cu | X | X | X |

○: No peeling (acceptable)
X: Occurrence of peeling (unacceptable)

From Table 1, the peeling of the junction interface was not found in each of Examples 1 to 5 that is provided with the Ag—Cu alloy having an appropriate composition range as the barrier layer even when the contact was heated to 600 to 750° C. and compressed. In contrast, the peeling of the junction interface occurred at the stage of heating to 600° C. in Conventional Example not having the barrier layer. In addition, as for the configuration of the barrier layer, in Comparative Example 1 having pure Ag as the barrier layer, the peeling did not occur until the contact was heated to 600° C., but the peeling occurred when the contact was heated to 700° C. or higher. Further, even when the Ag—Cu alloy is used as the barrier layer, since the peeling occurs due to excess and deficiency of the amount of Cu to be added when the contact is heated to 700° C. or higher (Comparative Examples 2 and 3), it is necessary to pay attention to the composition range of the Ag—Cu alloy.

Figure 5A:
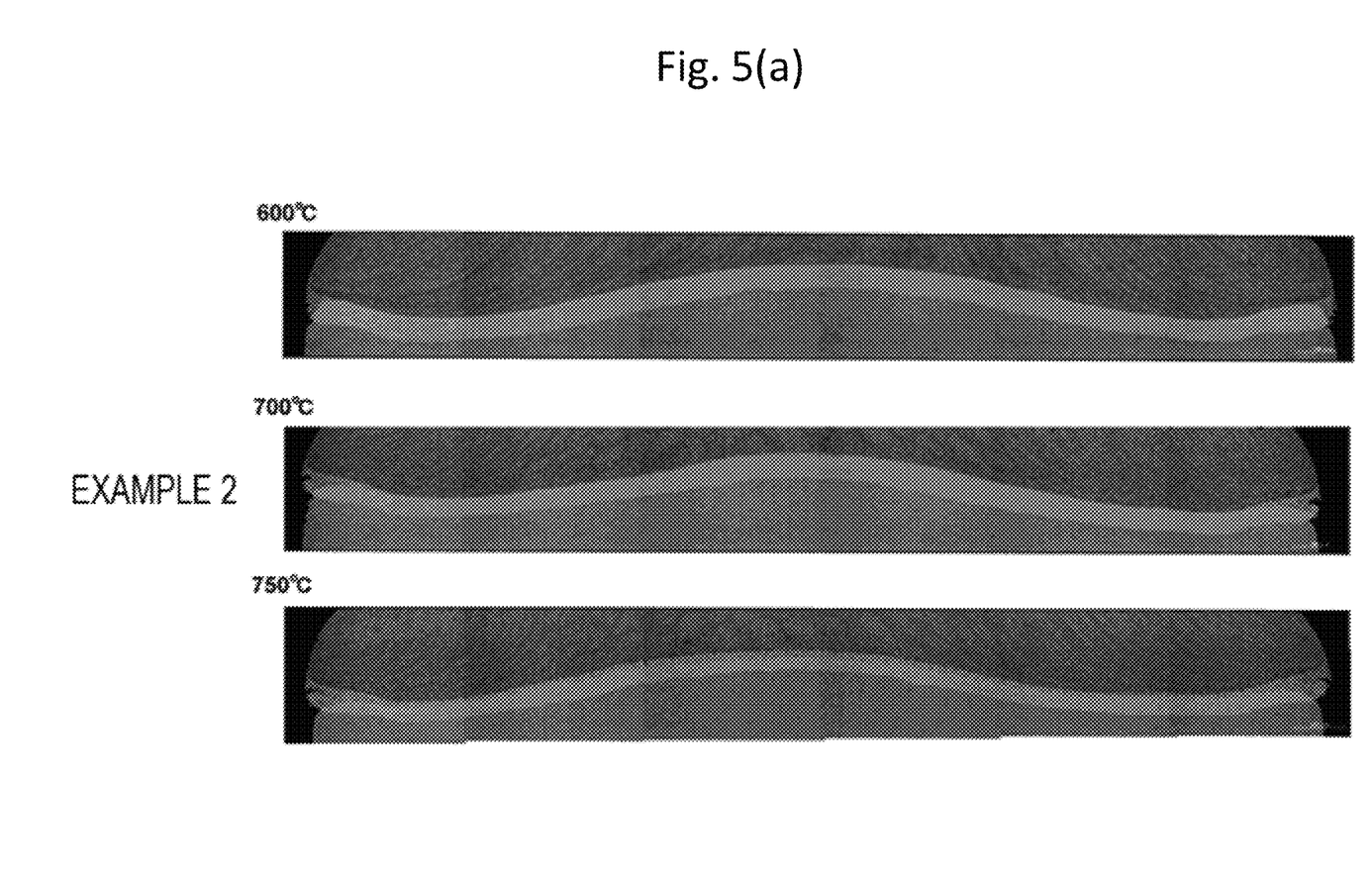
FIG. 5(a) is a photograph of a junction interface after a heating test for Example 2.
Figure 5B:
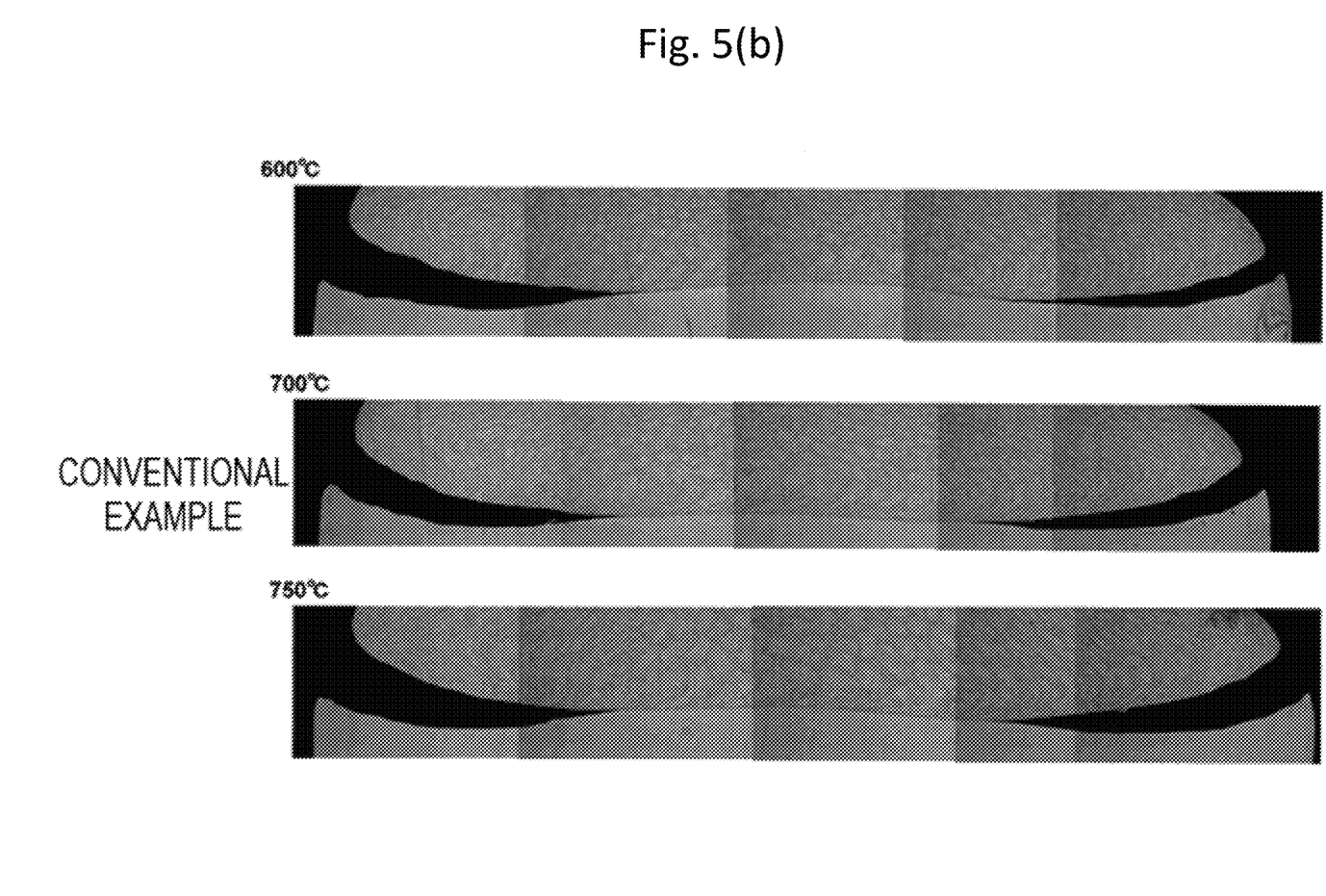
FIG. 5(b) is a photograph of a junction interface after a heating test for Conventional Example.
Figure 5C:
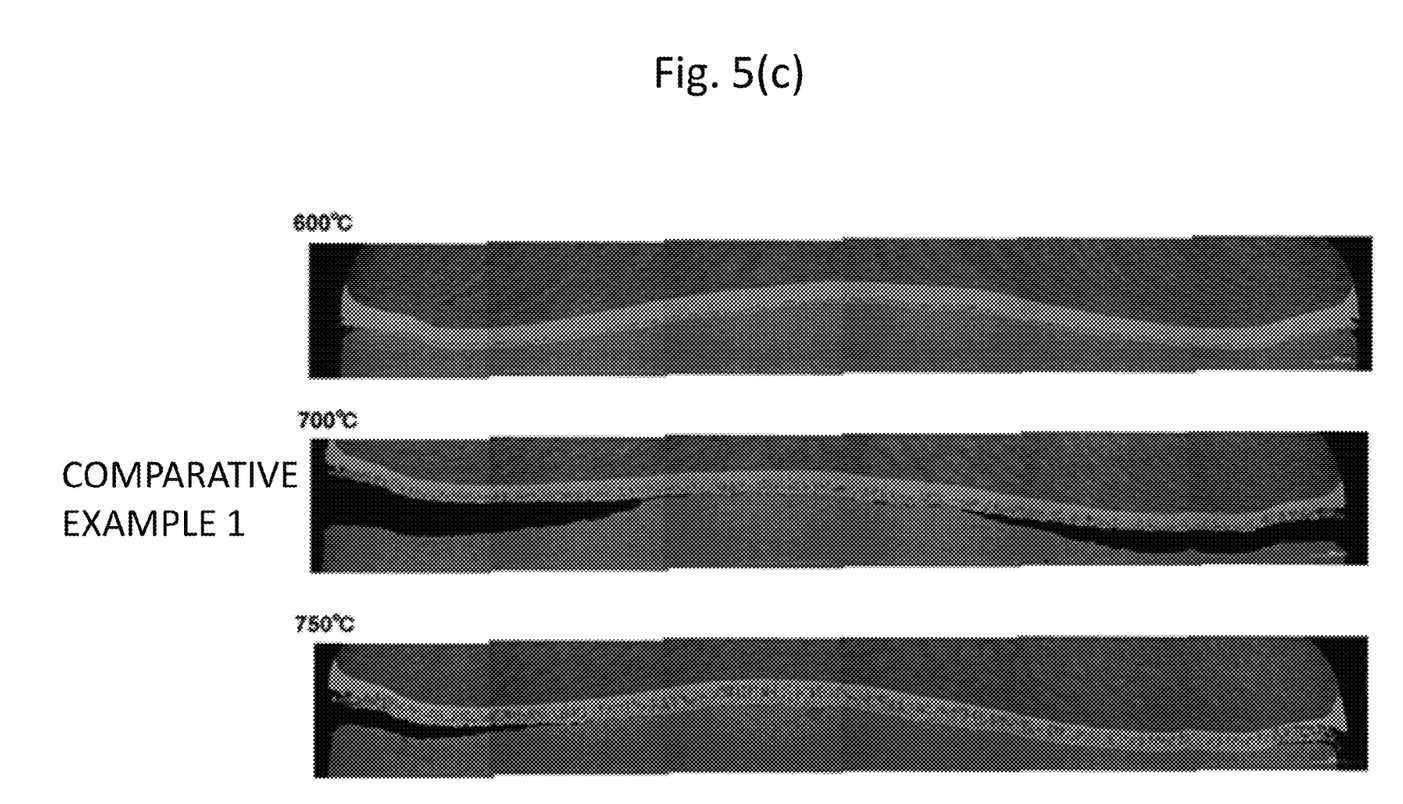
FIG. 5(c) is a photograph of a junction interface after a heating test for Comparative Example 1.

FIGS. 5(a), 5(b) and 5(c) illustrate an observation result of the junction interface after the heating test is performed on each contact of Example 2, Conventional Example, and Comparative Example 1, respectively. In the contact not having the barrier layer of Conventional Example, the peeling clearly occurs when the contact is heated to 600° C. In addition, in Comparative Example 1, the peeling was not found when the contact was heated to 600° C., but precipitation (black portion) of an oxide (Cu oxide) is found at an interface between the base material (Cu) and the barrier layer (Ag). Then, the amount of the oxide increases and the peeling occurs at the stage where the heating temperature reached 700° C. or higher. In contrast, in Example 2, a clear change is not found until the contact is heated to 700° C., and a Cu oxide was slightly generated at the interface between the contact material and the barrier layer when the contact was heated to 750° C. However, the generation of oxides is not observed between the barrier layer and the base material nor occurs the peeling. It can be considered that the oxides between the contact material and the barrier layer were generated when Cu of the Ag—Cu alloy serving as the barrier layer captured oxygen. From the above results, it can be confirmed that the barrier layer containing the Ag alloy can inhibit the arrival of the oxygen at the base material.

Figure 6:
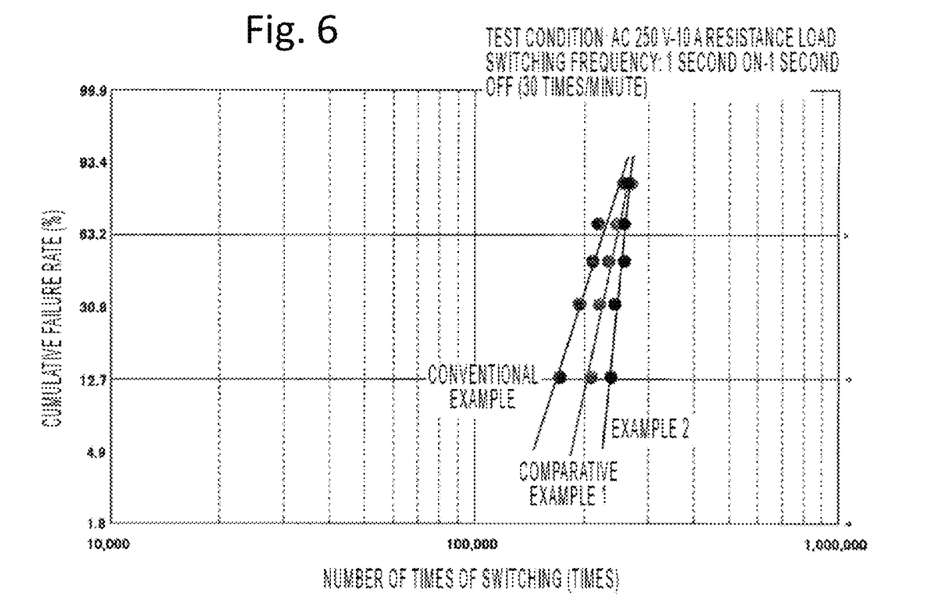
FIG. 6 shows a result of an endurance test in Example 2, Comparative Example 1, and Conventional Example.

Next, endurance of each rivet contact was evaluated. The endurance was evaluated in such a manner that the rivet contact was attached to a hinge-type alternating current general-use relay as a fixed contact; a switching operation was repeated in a state of a current-carrying load; and the number of times of endurance life until failure occurred was measured. Test conditions in the endurance evaluation test are as follows:

Test voltage: AC 250 V
Test current: 10 A
Load: Resistance load
Switching frequency: ON—one second/OFF—one second The above endurance test was performed with a plurality of relay testers, and the number of times of switching until each relay failed (endurance life) was plotted on Weibull probability paper. The results are illustrated in FIG. 6. From FIG. 6, life characteristics of each rivet contact are about 260,000 times in Example 2, about 240,000 times in Comparative Example 1, and about 220,000 times in Conventional Example. Accordingly, it was possible to confirm that the rivet contact of this embodiment has an excellent endurance life.

Second Embodiment

In this embodiment, the effects of change in kinds of contact materials and kinds and thicknesses of Ag alloys serving as barrier layers were confirmed. A basic manufacturing step is the same as in Example 1, and a second billet was cut out from each kind of Ag alloy while the thickness (length) of the Ag alloy was adjusted. Then, each manufactured rivet contact was subjected to a heating test in the same manner as in the first embodiment. A heating temperature was 750° C. The evaluation results are indicated in Table 2.

TABLE 2

| Configuration of contact (Contact material/barrier layer/base material) | Thickness of barrier layer | Results of heating test |
|---|---|---|
| Example 2 | SIE-29B/Ag—10Cu/Cu | 0.07 mm | No peeling |
| Example 6 | SIE-29B/Ag—10Cu/Cu | 0.03 mm | No peeling |
| Example 7 | SIE-29B/Ag—10Cu/Cu | 0.14 mm | No peeling |
| Example 8 | SIE-29B/Ag—5Cu/Cu | 0.07 mm | No peeling |
| Example 9 | FE-160/Ag—10Cu/Cu | 0.03 mm | No peeling |
| Example 10 | Ag/Ag—10Cu/Cu | 0.05 mm | No peeling |

Contact material:
SIE-29B . . . Ag—$SnO_2$—$In_2O_3$ alloy
FE-160 . . . Ag—$SnO_2$ alloy
Ag . . . Pure Ag Each kind of barrier layer was subjected to heating and compression tests, and as can be seen from Table 2, peeling at a junction interface was not found in any of the barrier layers. In addition, even when the contact material was changed, the effect was not changed. It can be seen that the barrier layer is effective to each kind of contact material.

INDUSTRIAL APPLICABILITY

In a rivet contact according to the present invention, peeling and falling of a contact material are prevented in the course of use. According to the present invention, an improved endurance life is added to original characteristics of the conventional double-layered rivet contact of reducing the amount of the contact material to be used and suppressing costs of members. The rivet contact according to the present invention is useful for a relay or switch of home appliances, industrial equipment, and other general application or a breaker and an electromagnetic switch for wiring in housing and wiring in industrial equipment.

The invention claimed is:

1. A rivet contact comprising a head portion and a foot portion having a smaller width than the head portion, wherein the head portion has a contact material layer having at least a top comprising an Ag-based contact material, a rest of the head portion and the foot portion comprise a base material containing Cu or a Cu alloy, and a barrier layer comprising an Ag alloy is provided at a junction interface between the contact material layer and the base material.

2. The rivet contact according to claim 1, wherein the Ag-based contact material is pure Ag, an Ag alloy, or an Ag-oxide alloy.

3. The rivet contact according to claim 1, wherein a thickness of the barrier layer is 0.03 mm to 0.3 mm.

4. The rivet contact according to claim 3, wherein the Ag-based contact material is pure Ag, an Ag alloy, or an Ag-oxide alloy.

5. The rivet contact according to claim 1, wherein the Ag alloy constituting the barrier layer is an Ag alloy obtained in such a manner that one or more base metal elements of Sn, In, Cu, Ni, Fe, Co, W, Mo, Zn, Cd, Te, and Bi are added to Ag by 0.03 to 20 mass %.

6. The rivet contact according to claim 5, wherein the Ag alloy constituting the barrier layer is an Ag alloy obtained in such a manner that Cu is added to Ag by 0.5 to 20 mass %.

7. The rivet contact according to claim 5, wherein a thickness of the barrier layer is 0.03 mm to 0.3 mm.

8. The rivet contact according to claim 5, wherein the Ag-based contact material is pure Ag, an Ag alloy, or an Ag-oxide alloy.

9. The rivet contact according to claim 1, wherein the Ag alloy constituting the barrier layer is an Ag alloy obtained in such a manner that Cu is added to Ag by 0.5 to 20 mass %.

10. The rivet contact according to claim 9, wherein a thickness of the barrier layer is 0.03 mm to 0.3 mm.

11. The rivet contact according to claim 9, wherein the Ag-based contact material is pure Ag, an Ag alloy, or an Ag-oxide alloy.

12. The rivet contact according to claim 9, wherein the Ag alloy constituting the barrier layer is also an Ag alloy obtained in such a manner that Ni is added by 0.03 to 1.0 mass %.

13. The rivet contact according to claim 12, wherein a thickness of the barrier layer is 0.03 mm to 0.3 mm.

14. The rivet contact according to claim 12, wherein the Ag-based contact material is pure Ag, an Ag alloy, or an Ag-oxide alloy.

15. A method of manufacturing the rivet contact defined in claim 1, the method comprising the steps of:

butt press-joining a first billet containing a contact material, a second billet containing an Ag alloy, and a third billet containing a base material to each other to manufacture a composite material;

forming a rivet-shaped space by a combination of a junction punch having a recessed space and a junction die having a cylindrical space;

press-fitting the composite material into the space of the junction punch from a lower part of the junction die; and filling the space with the first billet inside the junction punch to form a contact material layer constituting at least a top layer of a head portion, and filling the second billet and the third billet in a residual space inside the junction punch simultaneously to form the rest of the head portion, a barrier layer, and a foot portion.

16. The method of manufacturing the rivet contact according to claim 15, wherein the first billet, the second billet, and the third billet are press-joined to each other by a load of 0.8 to 3.0 ton·f in the process of manufacturing the composite material.

17. The method of manufacturing the rivet contact according to claim 15, comprising the step of forming a top of the head portion by press forming after forming the head portion and the foot portion.

18. A method of manufacturing the rivet contact defined in claim 5, the method comprising the steps of:

butt press-joining a first billet containing a contact material, a second billet containing an Ag alloy, and a third billet containing a base material to each other to manufacture a composite material;

forming a rivet-shaped space by a combination of a junction punch having a recessed space and a junction die having a cylindrical space;

press-fitting the composite material into the space of the junction punch from a lower part of the junction die; and filling the space with the first billet inside the junction punch to form a contact material layer constituting at least a top layer of a head portion, and filling the second billet and the third billet in a residual space inside the junction punch simultaneously to form the rest of the head portion, a barrier layer, and a foot portion.

19. A method of manufacturing the rivet contact defined in claim 9, the method comprising the steps of:

butt press-joining a first billet containing a contact material, a second billet containing an Ag alloy, and a third billet containing a base material to each other to manufacture a composite material;

forming a rivet-shaped space by a combination of a junction punch having a recessed space and a junction die having a cylindrical space;

press-fitting the composite material into the space of the junction punch from a lower part of the junction die; and filling the space with the first billet inside the junction punch to form a contact material layer constituting at least a top layer of a head portion, and filling the second billet and the third billet in a residual space inside the junction punch simultaneously to form the rest of the head portion, a barrier layer, and a foot portion.

20. A method of manufacturing the rivet contact defined in claim 12, the method comprising the steps of:

butt press-joining a first billet containing a contact material, a second billet containing an Ag alloy, and a third billet containing a base material to each other to manufacture a composite material;

forming a rivet-shaped space by a combination of a junction punch having a recessed space and a junction die having a cylindrical space;

press-fitting the composite material into the space of the junction punch from a lower part of the junction die; and filling the space with the first billet inside the junction punch to form a contact material layer constituting at least a top layer of a head portion, and filling the second billet and the third billet in a residual space inside the junction punch simultaneously to form the rest of the head portion, a barrier layer, and a foot portion.

* * * * *